(12) United States Patent
Bansal et al.

(10) Patent No.: US 11,379,431 B2
(45) Date of Patent: Jul. 5, 2022

(54) WRITE OPTIMIZATION IN TRANSACTIONAL DATA MANAGEMENT SYSTEMS

(71) Applicant: Microsoft Technology Licensing, LLC, Redmond, WA (US)

(72) Inventors: Yogesh Bansal, Redmond, WA (US); Anil Ruia, Redmond, WA (US); Alexandre Costa, Redmond, WA (US); Tobias Klima, Redmond, WA (US); Brett Shirley, Redmond, WA (US); Ian Jose, Redmond, WA (US); Andrew Goodsell, Redmond, WA (US); Serguei Martchenko, Redmond, WA (US); Umair Ahmad, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 251 days.

(21) Appl. No.: 16/707,369

(22) Filed: Dec. 9, 2019

(65) Prior Publication Data
US 2021/0173819 A1 Jun. 10, 2021

(51) Int. Cl.
*G06F 16/00* (2019.01)
*G06F 16/18* (2019.01)
(Continued)

(52) U.S. Cl.
CPC ........ *G06F 16/1865* (2019.01); *G06F 9/5083* (2013.01); *G06F 9/542* (2013.01);
(Continued)

(58) Field of Classification Search
None
See application file for complete search history.

(56) References Cited

U.S. PATENT DOCUMENTS

| 8,352,494 B1 * | 1/2013 | Badoiu | G06F 16/24554 707/780 |
| 8,856,138 B1 * | 10/2014 | Neubeck | G06F 16/2246 707/745 |

(Continued)

OTHER PUBLICATIONS

"B+ tree", Retrieved from https://en.wikipedia.org/wiki/B%2B_tree, Retrieved on Oct. 24, 2019, 6 Pages.

(Continued)

*Primary Examiner* — Jean M Corrielus
(74) *Attorney, Agent, or Firm* — Schwegman Lundberg & Woessner, P.A.

(57) ABSTRACT

A system for write optimization in transactional data management systems is described. The system stores a tree data structure that comprises a root, a plurality of internal nodes, and a plurality of leaf nodes. Each internal node comprises a pivot key and a child pointer. Each leaf node stores key-value pairs sorted by a corresponding key. The system forms a plurality of hybrid nodes. The hybrid nodes comprise a layer of internal nodes that are immediate parents of the plurality of leaf nodes. A buffer is formed only for each internal node of the plurality of hybrid nodes. The buffer is used to store a message that encodes an operation. The message is to be applied to the corresponding leaf nodes of the plurality of hybrid nodes.

20 Claims, 10 Drawing Sheets

(51) Int. Cl.
   *G06F 16/17* (2019.01)
   *G06F 16/16* (2019.01)
   *G06F 16/22* (2019.01)
   *G06F 9/54* (2006.01)
   *G06F 9/50* (2006.01)
   *G06F 16/245* (2019.01)

(52) U.S. Cl.
   CPC .............. *G06F 9/544* (2013.01); *G06F 9/546* (2013.01); *G06F 16/162* (2019.01); *G06F 16/1734* (2019.01); *G06F 16/2246* (2019.01); *G06F 16/245* (2019.01); *G06F 2209/5022* (2013.01)

(56) References Cited

U.S. PATENT DOCUMENTS

| | | | | |
|---|---|---|---|---|
| 8,996,563 | B2* | 3/2015 | Bender | G06F 16/258 707/769 |
| 10,719,495 | B2* | 7/2020 | Boles | G06F 16/2246 |
| 10,725,988 | B2* | 7/2020 | Boles | G06F 16/2246 |
| 2010/0133800 | A1* | 6/2010 | Buschjohann | B62D 21/11 280/781 |
| 2011/0246503 | A1* | 10/2011 | Bender | G06F 16/258 707/769 |
| 2013/0339395 | A1* | 12/2013 | Sewall | G06F 16/2246 707/797 |
| 2015/0161178 | A1* | 6/2015 | Bdoiu | G06F 16/5838 707/723 |
| 2015/0370860 | A1* | 12/2015 | Bender | G06F 16/2365 707/609 |
| 2018/0225315 | A1* | 8/2018 | Boles | G06F 16/2455 |
| 2018/0225316 | A1* | 8/2018 | Boles | G06F 16/2246 |
| 2018/0276250 | A1* | 9/2018 | Badoiu | G06F 16/583 |
| 2019/0294709 | A1* | 9/2019 | Gupta | G06F 16/24553 |
| 2020/0257669 | A1* | 8/2020 | Boles | G06F 16/2455 |
| 2020/0349139 | A1* | 11/2020 | Boles | G06F 16/2246 |

OTHER PUBLICATIONS

"Fractal Tree Index", Retrieved from https://en.wikipedia.org/wiki/Fractal_tree_index, Retrieved on Oct. 24, 2019, 6 Pages.

"Log-Structured Merge-Tree", Retrieved from https://en.wikipedia.org/wiki/Log-structured_merge-tree, Retrieved on Oct. 24, 2019, 2 Pages.

Bender, et al., "An Introduction to B?-trees and Write-Optimization", In login, Magazine, vol. 40, Issue 5, Oct. 1, 2015, 8 Pages.

* cited by examiner

WRITE OPTIMIZATION IN TRANSACTIONAL DATA MANAGEMENT SYSTEMS

TECHNICAL FIELD

The subject matter disclosed herein generally relates to a special-purpose machine that operates a data management system. Specifically, the present disclosure addresses systems and methods for improving write performance in transactional data management systems.

BACKGROUND

Data management systems are traditionally designed for data access patterns where information is written once and is read multiple times through the lifetime of the data set. B+ trees are typically used in such data management systems as a primary data structure to keep the data in the external storage. Data access trends throughout the industry have changed, and very often, large amount of data is being collected and processed. However, the data is seldom accessed after that.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
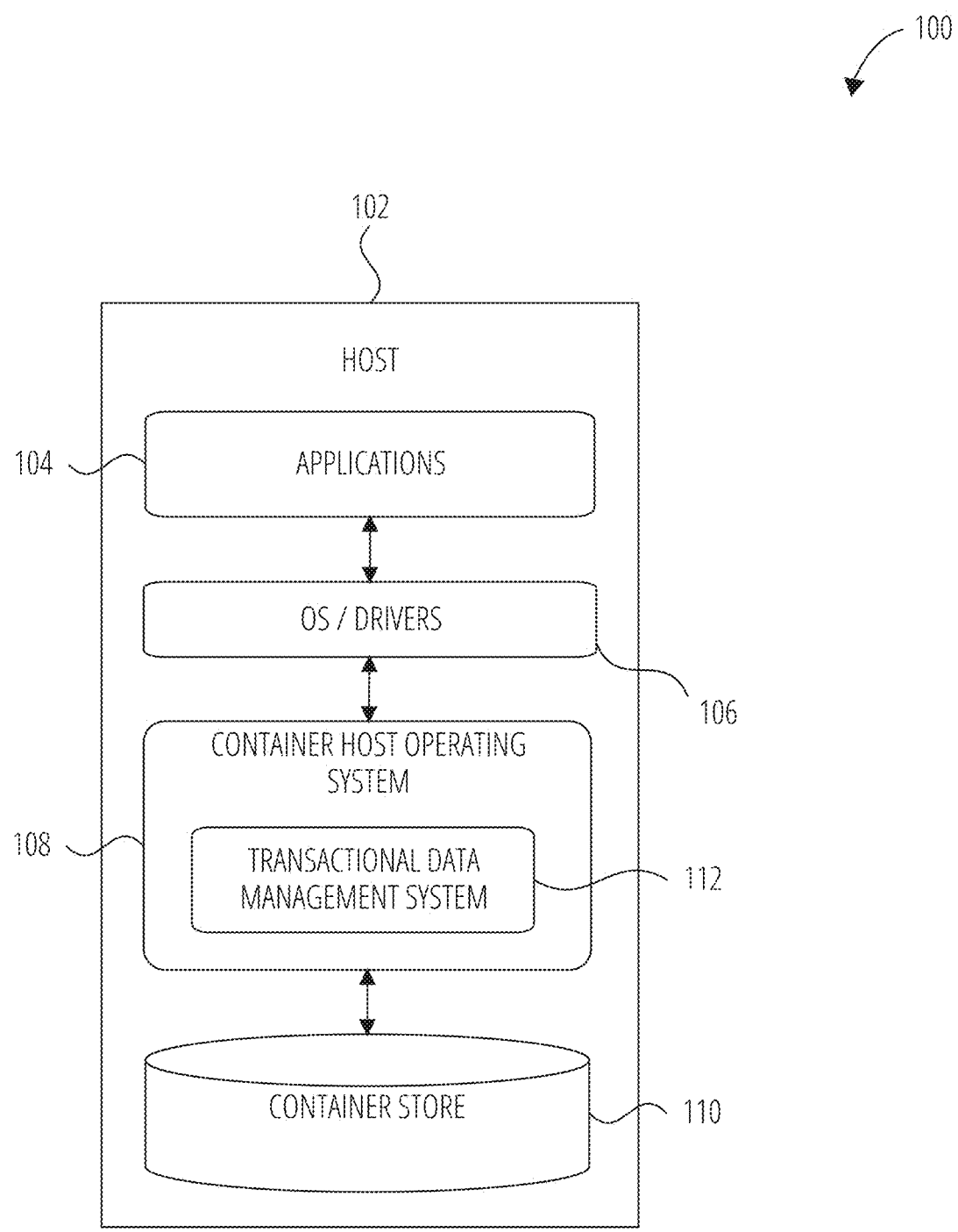
FIG. 1 is a block diagram illustrating a computing environment in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Traditionally, data management systems have been designed for data access patterns where information is written once and is read multiple times through the lifetime of the data set. B+ trees have been used in such data management systems as a primary data structure to keep the data in the external storage. However, data access trends have recently changed throughout the industry. Very often large amount of data is being collected and processed with the data being subsequently seldom accessed. The present application describes a Buffered B+ Tree data structure (also referred to as bB+ tree). The Buffered B+ Tree data structure provides write IO performance and offers additional improvements that are useful in practical applications of the bB+ tree in the transactional data management systems.

In one example embodiment, the system stores a tree data structure that comprises a root, a plurality of internal nodes, and a plurality of leaf nodes. Each internal node comprises a pivot key and a child pointer. Each leaf node stores key-value pairs sorted by a corresponding key. The system forms a plurality of hybrid nodes. The hybrid nodes comprise a layer of internal nodes that are immediate parents of the plurality of leaf nodes. A buffer is formed only for each internal node of the plurality of hybrid nodes. The buffer is used to store a message that encodes an operation. The message is to be applied to the corresponding leaf nodes of the plurality of hybrid nodes.

As a result, one or more of the methodologies described herein facilitate solving the technical problem of efficiently accessing and storing data in a data storage device. As such, one or more of the methodologies described herein may obviate a need for certain efforts or computing resources that otherwise would be involved in data management systems that have been designed for data access patterns where information is written once and is read multiple times through the lifetime of the data set. As a result, resources used by one or more machines, databases, or devices (e.g., within the environment) may be reduced. Examples of such computing resources include processor cycles, network traffic, memory usage, data storage capacity, power consumption, network bandwidth, and cooling capacity.

FIG. 1 is a block diagram illustrating a computing environment 100 in accordance with one example embodiment. In one example, the computing environment 100 includes a computing device such as a host 104. The host 104 comprises applications 102, OS/drivers 108, a container host operating system 110, and a container store 112. The applications 102 include, for example, software applications that are configured to access (e.g., read, write, delete, query) data stored in the container store 112. The applications 102 communicates with the container store 112 via OS/drivers 108 and the container host operating system 110. The OS/drivers 108 includes an operating system of the host 104 and drivers to communicate with other components (e.g., storage system, media system). The container host operating system 110 interfaces with the container store 112 via a transactional data management system 106.

The transactional data management system 106 configures the data structure of the container store 112. The transactional data management system 106 forms a tree data structure (e.g., bB+ tree). In one example embodiment, the bB+ tree consists of internal nodes and leaves, with internal nodes containing pivot keys and child pointers, and leaf nodes storing key-value pairs sorted by the key. A layer of internal nodes also allocates additional buffer. The buffer is used to store messages that encode an insert, update, delete, or query operation. These pending operations are eventually applied to the leaves under this node.

Figure 3:
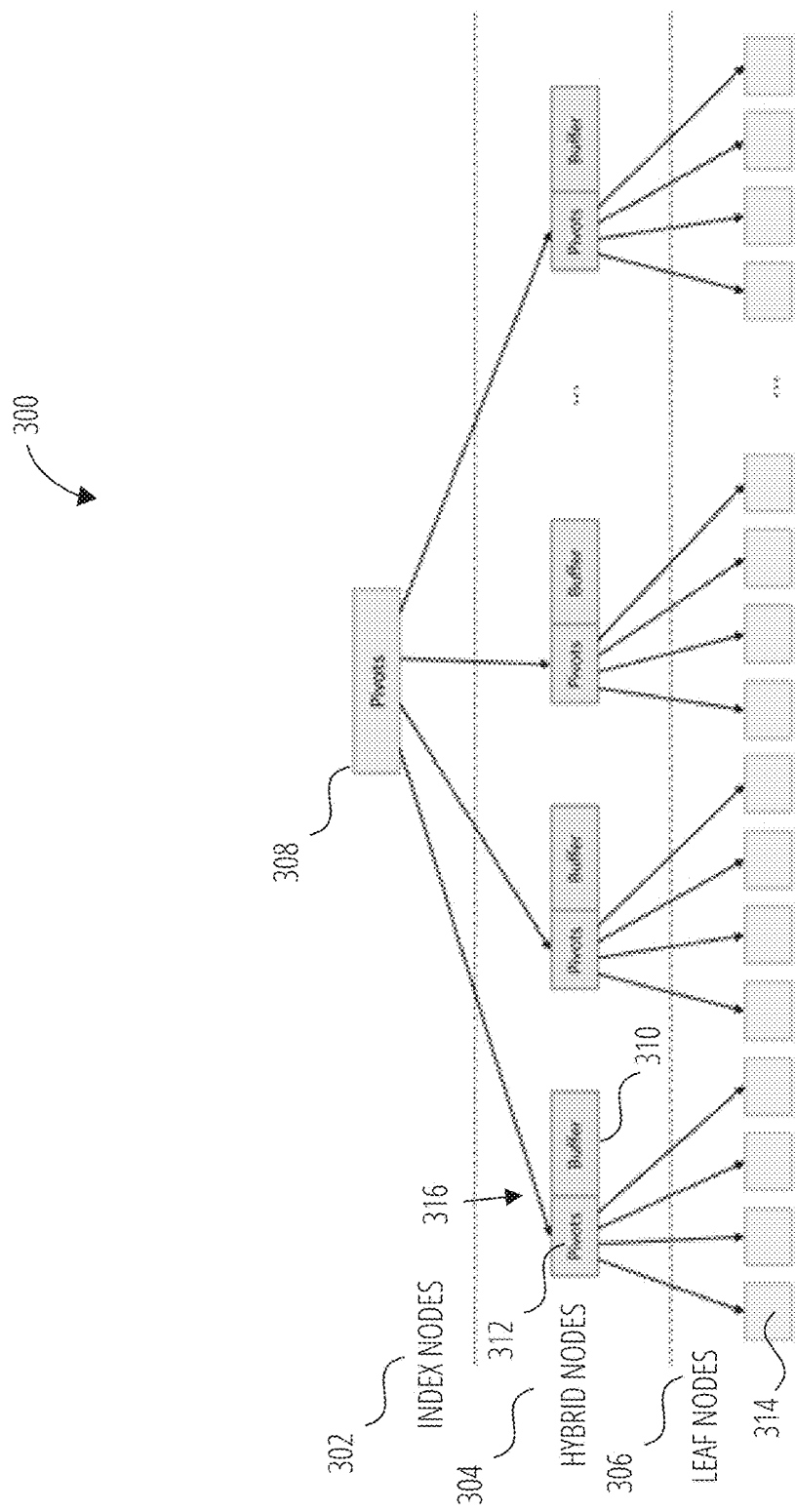
FIG. 3 illustrates a tree structure in accordance with one example embodiment.

As illustrated in FIG. 3, only the nodes that are immediate parents of leaf nodes do include such buffers. These nodes form a layer of nodes just above the leaves. Because these nodes combine the features of both leaves and internal nodes, these nodes are referred to as hybrid nodes in the present application.

The bB+ tree provides the following key-value APIs:
insert(k,v)
update(k,v)
delete(k)
v query(k)
$[(k_1, v_1), \ldots, (k_n, v_n)]$ range-query($k_1, k_n$)

The size of the node is chosen to be a multiple of the underlying external storage device block size. Other factors to consider when choosing the node size is the average sizes of keys and values stored in the tree. These factors dictate the branch factor of the tree and the average number of messages that can be buffered. Therefore, these factors have a direct impact on the bB+ tree performance. It is desirable to use a larger node size (to allow the internal nodes to store large number of keys), resulting in more shallow trees, and hybrid nodes to have enough space in the buffer for a reasonably large number of messages.

Figure 2:
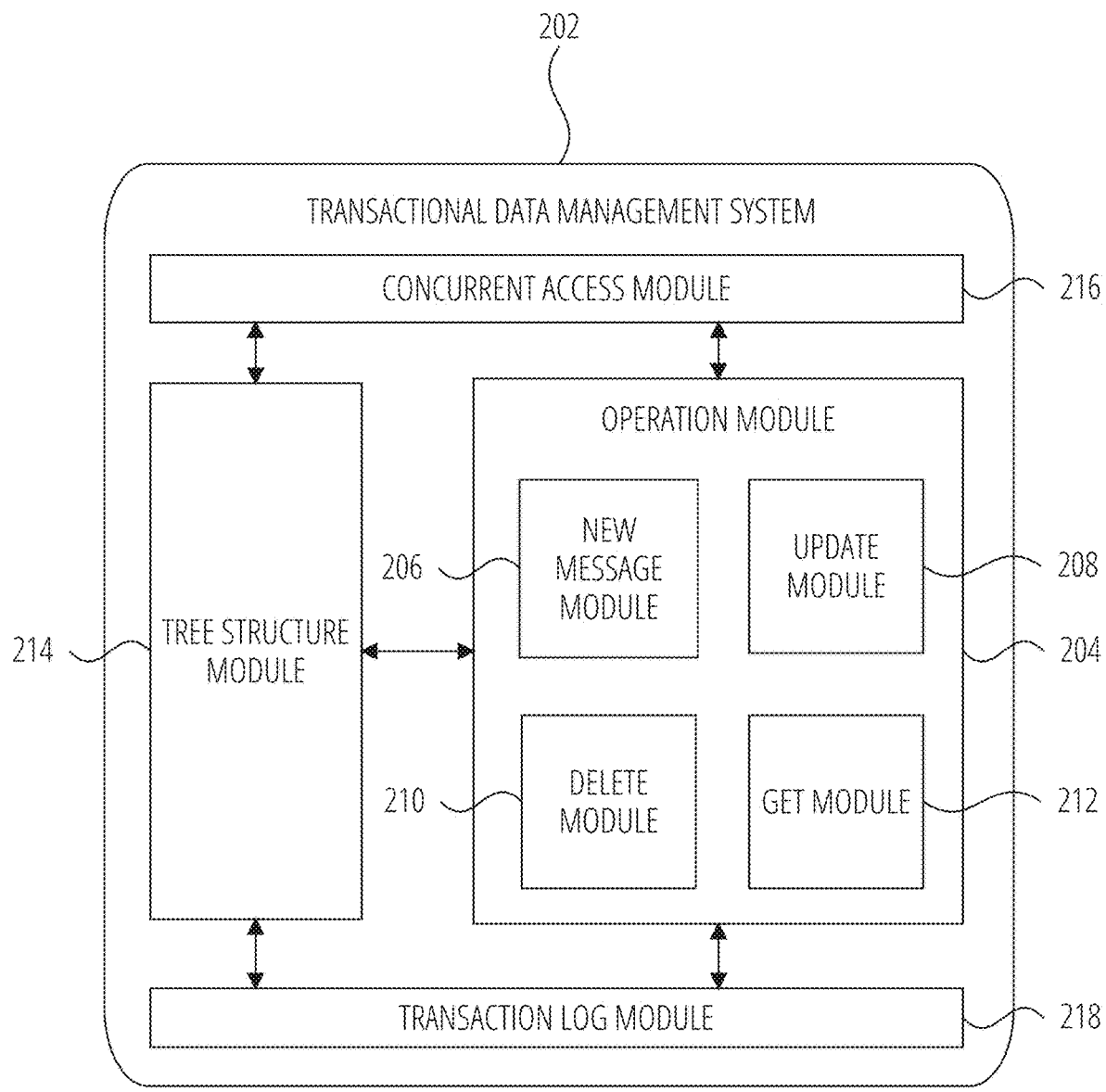
FIG. 2 illustrates a transactional data management system in accordance with one example embodiment.

FIG. 2 illustrates a transactional data management system 202 in accordance with one example embodiment. The transactional data management system 202 includes a tree structure module 212, an operation module 214, a concurrent access module 216, and a transaction log module 218.

The tree structure module 212 forms the bB+ tree data structure. In one example embodiment, the bB+ tree consists of internal nodes and leaves, with internal nodes containing pivot keys and child pointers, and leaf nodes storing key-value pairs sorted by the key. A layer of internal nodes also allocates additional buffer. The buffer is used to store messages that encode an operation. These pending operations are applied to the leaves under this node.

The operation module 214 comprises operations to be performed on the tree data structure formed by tree structure module 212. In one example embodiment, the operation module 214 include a new message module 204, an update module 206, a get module 208, and a delete module 210. These operations are encoded as messages addressed to a particular key and added to the buffer of the hybrid node which is along the path from the root to the leaf. When enough messages have been added to the hybrid node to fill the buffer, a child leaf node with most pending messages is selected, and a batch of messages is applied to it. When the leaf becomes full, it splits, and a pointer to the new leaf is added to the hybrid node. When hybrid node gets too many children, it also splits, and all pending messages are distributed between the two new hybrid nodes. When internal nodes above the hybrid layer get too many children, they split.

The bB+ tree relies on the in-memory cache management to achieve the reduction of write IO operations. The bB+ tree exploits the fact that internal nodes of a tree are much more likely to be present in the cache when a new key-value pair is inserted or updated, or a key is deleted. It also takes advantage of the fact that because there are much fewer hybrid nodes in the tree than there are leaf nodes. Therefore, it is much more likely that consecutive changes update the same hybrid node that was previously modified by another change. Whenever such event happens, the node is only updated in memory, and logically independent changes are coalesced into a single write IO operation.

When a hybrid node buffer becomes full and the pending messages are applied to the appropriate leaf node, the logically independent changes are also coalesced together in the single write IO operation. Therefore, if the branching factor of a hybrid node is b and the average number of messages in a buffer is M, then on average the buffered messages are applied to the leaf only once after f=M/b updates. This effectively reduces the number of required write IO operations on leaf nodes.

Typical cache management systems force writes of the updated pages into the external storage device. This is necessary to ensure that all changes to the data are timely written to the storage, which in turn reduces the amount of transaction logs that must be inspected and reapplied during system recovery. Because of these forced writes, and because there are usually a lot of leaf nodes, it is likely that an updated leaf node will be written on the external storage device before it is updated by a consecutive message flush from the parent hybrid node.

To maximize the write IO improvements, it is desirable to maintain higher value of f, which can be achieved by increasing M and by reducing branch factor b of the hybrid nodes. The trade-offs, therefore, are a higher buffer size, necessary to keep enough messages buffered in a hybrid node, and a larger number of hybrid nodes and a taller tree, which is not desirable because of the increased overhead. From the practical standpoint, a good write performance with relatively small overhead is observed when number of hybrid nodes is approximately 10% of the overall number of nodes in the tree, which gives the branch factor b=~10.

Two embodiments can be used to allocate buffer for a hybrid node. In one embodiment, the buffer can use the free space inside the hybrid node that is not used by the pivot keys and pointers to the leaf nodes. In another embodiment, a dedicated node can be allocated for the buffer, and a pointer to the buffer node is kept in the hybrid node in addition to the set of pointers to the node children. Both embodiments have their own advantages and disadvantages. For example, if both keys and values are relatively small, then it is more efficient to use the free space inside the hybrid node for a buffer to reduce the internal node fragmentation. However, if values are relatively large, then the unused space inside the hybrid node may not be enough to store sufficient number of messages. A dedicated node for the buffer (which could also be bigger than the other tree nodes) may offer better write IO performance.

Having only the hybrid nodes with buffers makes it simpler to implement additional optimizations that aim to minimize unused space in the leaf nodes and reduce internal fragmentation and storage overhead. For example, when choosing the leaf node to apply pending messages, a node with the most available space may be selected to avoid leaf node splits and improve storage space utilization.

The get module 208 operates point and range queries. Point queries are implemented with the additional check for messages that may still be pending in the hybrid node buffer. If a message is pending, it is applied to the result before the query is answered. If the pending message encodes a delete operation, the query will return "NOT FOUND."

Range queries are similar to the point queries and apply all pending messages within the key range. The bB+ tree with range queries maintains pointers to the previous and next leaf nodes and accelerates node lookups when values in the tree are iterated in the direct or reverse order. In another example embodiment, the pointers to the previous and next nodes are maintained between hybrid nodes. This allows the range query implementation to efficiently navigate between hybrid nodes within the key range and follow child pointers from the hybrid nodes to find the values and apply any messages that may be pending in the parent hybrid node buffers.

The concurrent access module 216 provides the ability to read and write data concurrently by executing multiple requests in parallel. Traditionally, concurrent access relies on reader-writer node latches to offer high concurrency for the requests that access different parts of the tree. Also, traditional concurrent access provides internal consistency when various tree nodes are updated when data is written, or when nodes split and new pivot keys are inserted into internal nodes in various levels of the tree.

B+ trees perform well with such node latches, because often only a single leaf node is being updated. Therefore, a write latch on that node is enough to complete the operation. Because the B+ tree usually has a lot of leaves, these latches are well partitioned resulting in very little lock contention while updating leaves. Occasional node splits require more write latches, but because of the high branching factor of the B+ tree, these additional latches are amortized, and do not result in a significant increase in the lock contention. This makes B+ trees friendly to the concurrent requests.

In contrast, updates in $B^\epsilon$ tree almost always require an update of the root node, and often require child nodes to be updated when messages stored in the root buffer are flushed into the child nodes. The root node therefore becomes a bottleneck in the data flow, which causes significant increase in the lock contention for requests that perform updates to the same tree. Therefore, $B^\epsilon$ trees are not friendly to the concurrent requests, which may result in a significant performance degradation in busy servers that process hundreds of requests concurrently.

In contrast, buffers that are attached only to the hybrid nodes offer a reasonable mitigation to the lock concurrency problem of $B^\epsilon$ trees. With the concurrent access module 216, when items are inserted, updated, or deleted, only one hybrid node, which is the parent of the right leaf for the target key, must be updated most of the time. Occasional flushes of the messages in the buffer into the leaf nodes, or occasional updates because of node splits are amortized. Because there are usually several of hybrid nodes in the tree, these updates are reasonably well partitioned. This results in the reduced lock contention and higher concurrency compared to $B^\epsilon$ trees.

In another example, the concurrent access module 216 considers the bB+ tree as a collection of small $B^\epsilon$ subtrees, which are just 2 levels tall, that represent internal data partitions indexed by the internal nodes above these subtrees. This partitioning scheme exploits the same idea as hash tables, and therefore it provides similar performance characteristics. Because the number of internal nodes above the hybrid nodes grows very slowly with the tree size, the bB+ tree can be considered as a hash table of B trees that represent non-overlapping ranges of values ordered by the smallest key in each range.

The transaction log module 218 enables logging of data modifications into a log of transactions for data consistency and crash recovery. The log of transactions is inspected and re-applied as necessary every time the transactional data management system 202 is brought online. In case of the transactional data management system 202 is busy, the volume of transaction logs that are produced while the requests are being processed may become large. This can result in high demand for the additional storage and write throughput, which in turn, causes scalability bottlenecks within the transactional data management system 202.

Typically, a record in a transaction log is produced for every node that is modified by the transaction. In case of B+ trees, transaction logs are produced when leaf nodes are updated, which represents the vast majority of the changes that happen within the tree. Occasional internal node updates caused by child node splits is a small fraction of these changes, which are asymptotically amortized. Therefore B+ trees offer multiplication factor that is O(1), and in practice the value is only slightly bigger than 1.

When messages travel through the buffers of internal nodes of a $B^\epsilon$ tree, multiple transaction logs are produced during the lifetime of the message, one for each internal node visited by the message. The multiplication factor for transaction logs is therefore O(h)=O(log N) which proportional to the size of the tree. Therefore, the bigger the data set stored in the tree, the larger the volume of transaction logs becomes.

If the buffers are allocated only for the hybrid nodes, the buffered messages can visit at most two tree nodes during its lifetime regardless of the size of the tree. Therefore, the multiplication factor for the bB+ tree is slightly bigger than 2, which is asymptotically the same as O(1) factor of B+ trees. This is a considerable reduction in transaction logs compared to the $B^\epsilon$ tree and is a significant improvement for practical applications.

FIG. 3 illustrates a tree data structure 300 in accordance with one example embodiment. The tree data structure 300 includes three layers: an index nodes layer 302, a hybrid nodes layer 304, and a leaf nodes layer 306. The index nodes layer 302 include a root 308 that includes pivot keys that points to nodes from the hybrid nodes layer 304. Each hybrid node 316 from the hybrid nodes layer 304 includes a pivot key 312 and a buffer 310. Each hybrid node 316 points to a leaf node 314 from the leaf nodes layer 306.

Figure 4:
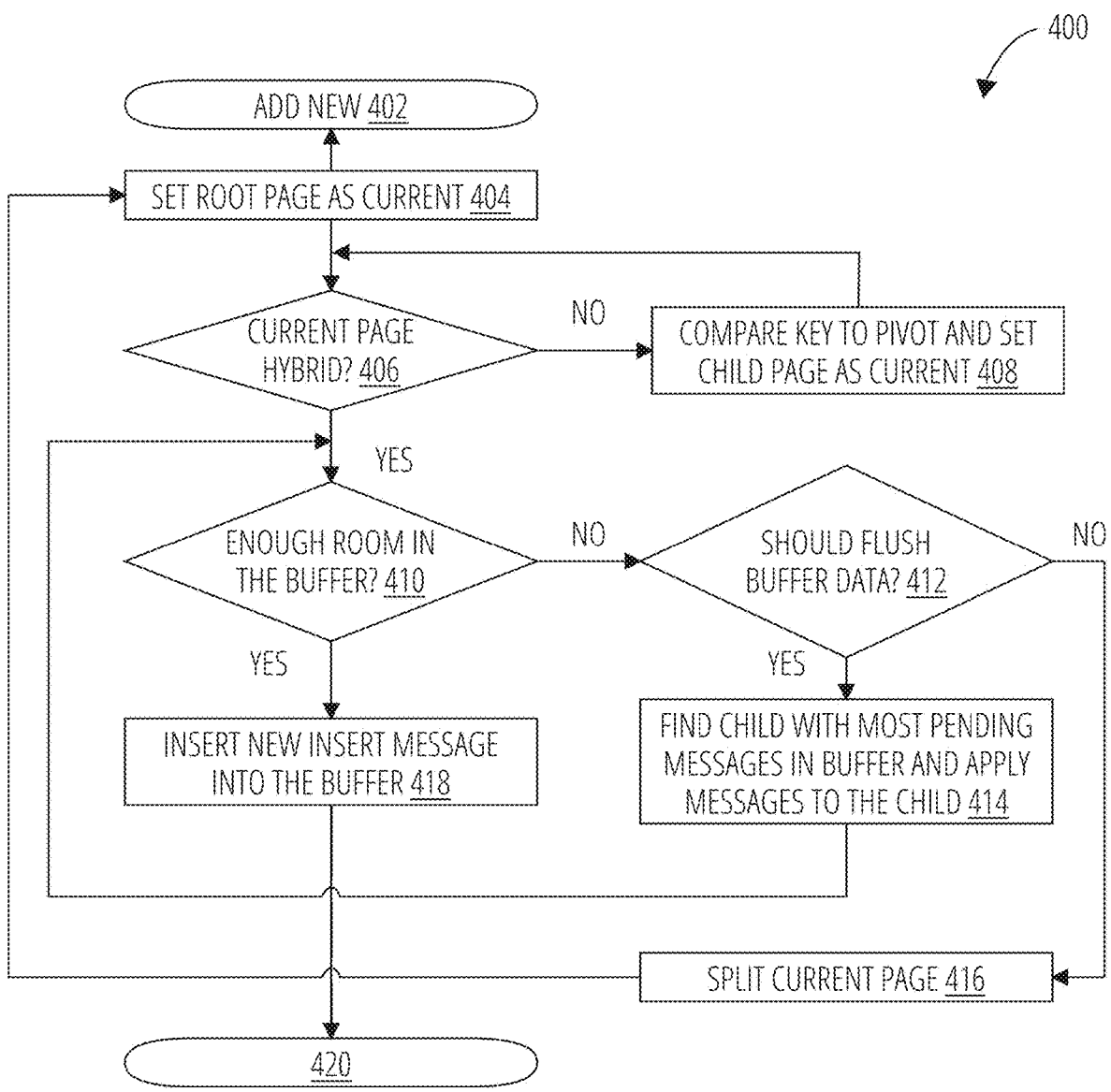
FIG. 4 illustrates a flow diagram of an update operation in accordance with one example embodiment.

FIG. 4 illustrates a flow diagram 400 in accordance with one example embodiment. Operations in the flow diagram 400 may be performed by the transactional data management system 202 using components (e.g., modules, engines) described above with respect to FIG. 2. Accordingly, the flow diagram 400 is described by way of example with reference to the transactional data management system 202. However, it shall be appreciated that at least some of the operations of the flow diagram 400 may be deployed on various other hardware configurations or be performed by similar components residing elsewhere.

At block 402, the transactional data management system 202 receives an operation to add new data. At block 404, the new message module 204 sets a root page as current. At decision block 406, the new message module 204 determines whether the current page is a hybrid page (e.g., hybrid node layer). If not, the new message module 204 compares the key to the pivot and set the child page as current at block 408. If the new message module 204 determines that the current page is a hybrid page, the new message module 204 determines whether there is enough room in the buffer at decision block 410. If there is enough room in the buffer, the new message module 204 inserts a new insert message into the buffer at block 418 and the operation ends at block 420.

If the new message module 204 determines that there is not enough room in the buffer, the new message module 204 determines whether to flush the buffer data at decision block 412. If the buffer data is to be flushed, the new message module 204 finds the child node with the most pending message in the buffer and applies the messages to the child node at block 414. If the buffer data is to not be flushed, the new message module 204 splits the current node at block 416 and returns to block 404.

Figure 5:
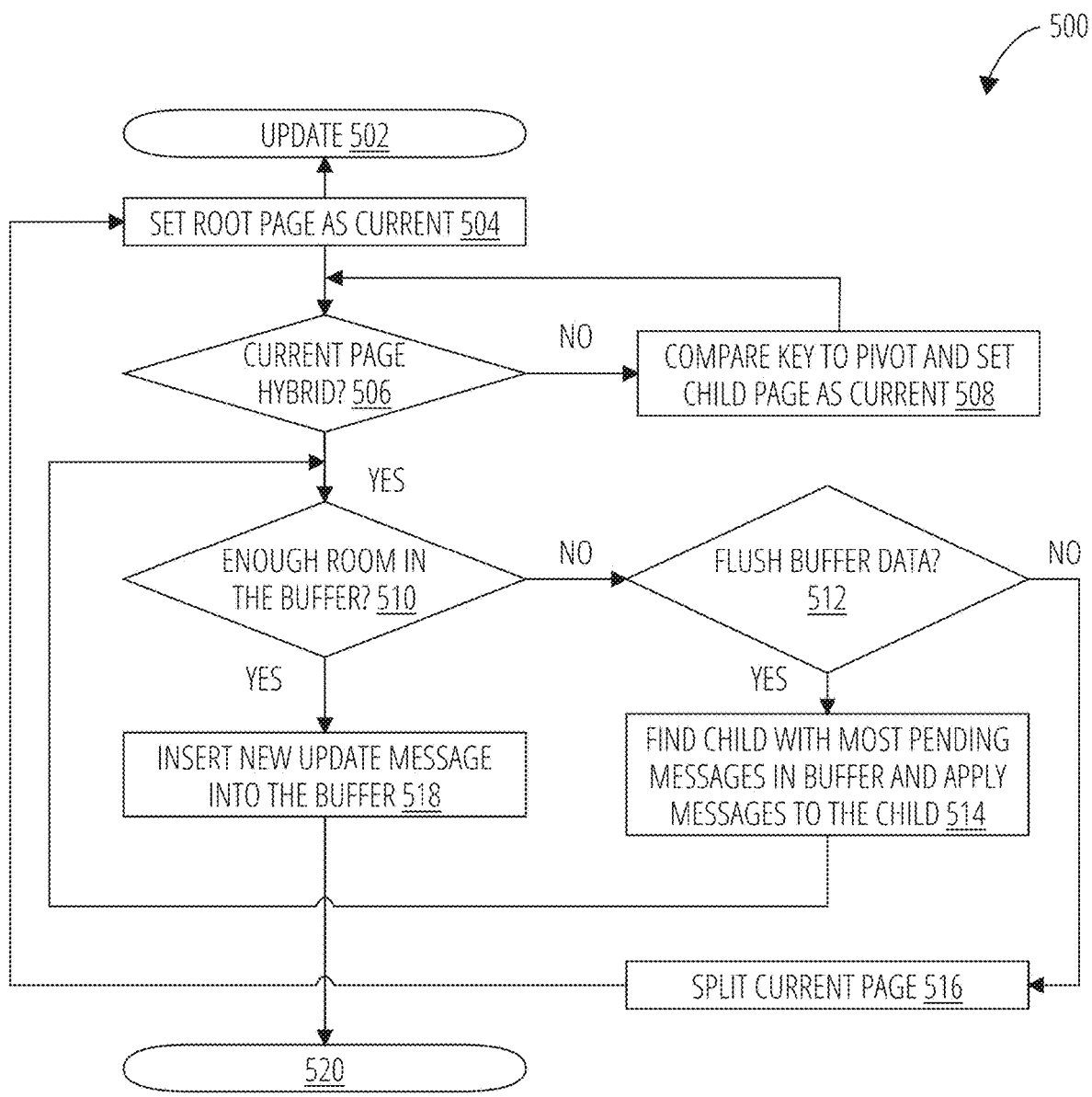
FIG. 5 illustrates a flow diagram of an update operation in accordance with one example embodiment.

FIG. 5 illustrates a flow diagram 500 in accordance with one example embodiment. Operations in the flow diagram 500 may be performed by the transactional data management system 202 using components (e.g., modules, engines) described above with respect to FIG. 2. Accordingly, the flow diagram 500 is described by way of example with reference to the transactional data management system 202. However, it shall be appreciated that at least some of the operations of the flow diagram 500 may be deployed on various other hardware configurations or be performed by similar components residing elsewhere.

At block 502, the transactional data management system 202 receives an operation to add update data. At block 504, the update module 206 sets a root page as current. At decision block 506, the update module 206 determines whether the current page is a hybrid page (e.g., hybrid node layer). If not, the update module 206 compares the key to the pivot and set the child page as current at block 508. If the update module 206 determines that the current page is a hybrid page, the update module 206 determines whether there is enough room in the buffer at decision block 510. If there is enough room in the buffer, the update module 206 inserts a new update message into the buffer at block 518 and the operation ends at block 520.

If the update module 206 determines that there is not enough room in the buffer, the update module 206 determines whether to flush the buffer data at decision block 512. If the buffer data is to be flushed, the update module 206 finds the child node with the most pending message in the buffer and applies the messages to the child node at block 514. If the buffer data is to not be flushed, the update module 206 splits the current node at block 516 and returns to block 504.

Figure 6:
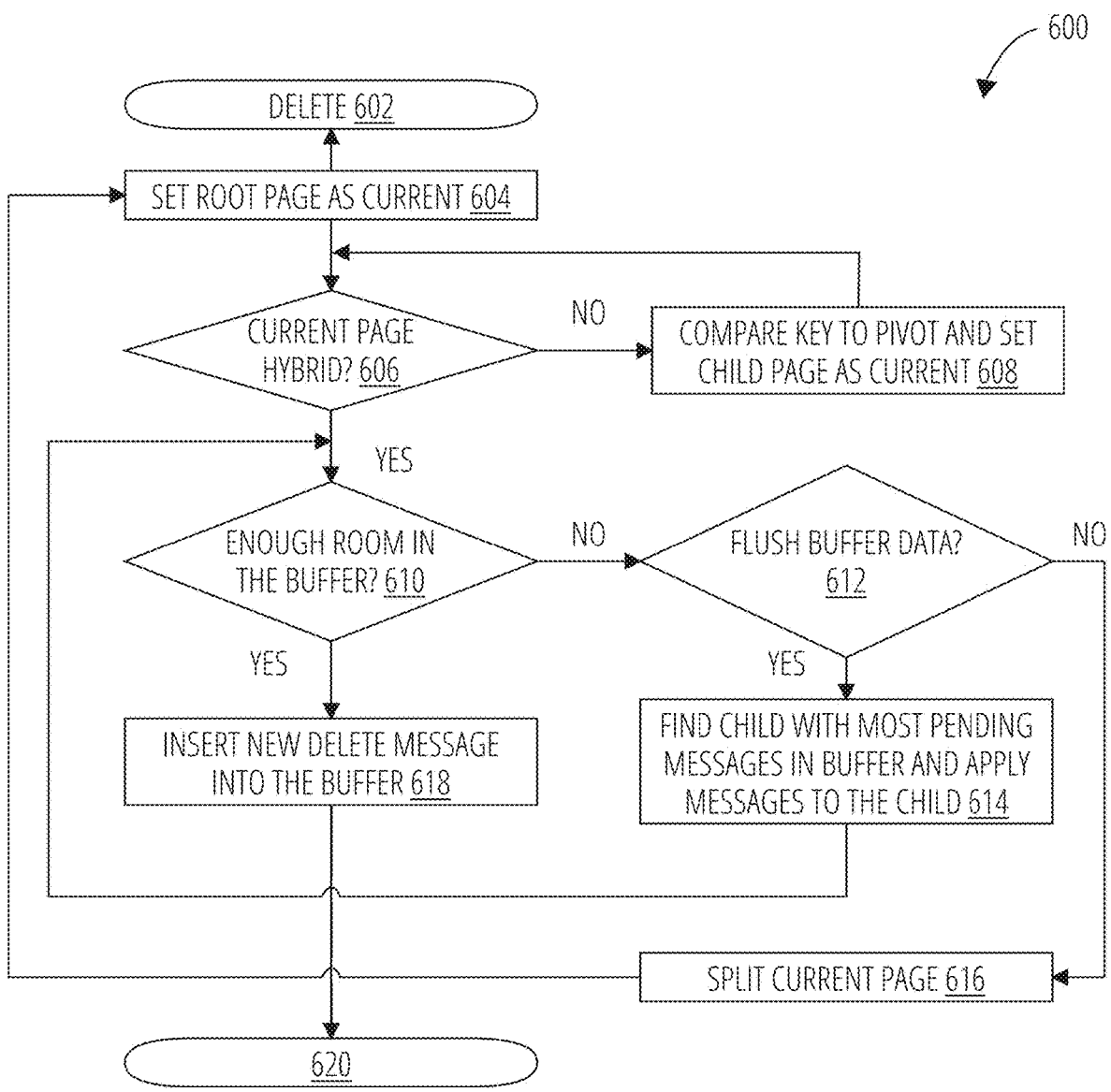
FIG. 6 illustrates a flow diagram of a delete operation in accordance with one example embodiment.

FIG. 6 illustrates a flow diagram 600 in accordance with one example embodiment. Operations in the flow diagram 600 may be performed by the transactional data management system 202 using components (e.g., modules, engines) described above with respect to FIG. 2. Accordingly, the flow diagram 600 is described by way of example with reference to the transactional data management system 202. However, it shall be appreciated that at least some of the operations of the flow diagram 600 may be deployed on various other hardware configurations or be performed by similar components residing elsewhere.

At block 602, the transactional data management system 202 receives an operation to delete data. At block 604, the delete module 210 sets a root page as current. At decision block 606, the delete module 210 determines whether the current page is a hybrid page (e.g., hybrid node layer). If not, the delete module 210 compares the key to the pivot and set the child page as current at block 608. If the delete module 210 determines that the current page is a hybrid page, the delete module 210 determines whether there is enough room in the buffer at decision block 610. If there is enough room in the buffer, the delete module 210 inserts a new delete message into the buffer at block 618 and the operation ends at block 620.

If the delete module 210 determines that there is not enough room in the buffer, the delete module 210 determines whether to flush the buffer data at decision block 612. If the buffer data is to be flushed, the delete module 210 finds the child node with the most pending message in the buffer and applies the messages to the child node at block 614. If the buffer data is to not be flushed, the delete module 210 splits the current node at block 616 and returns to block 604.

Figure 7:
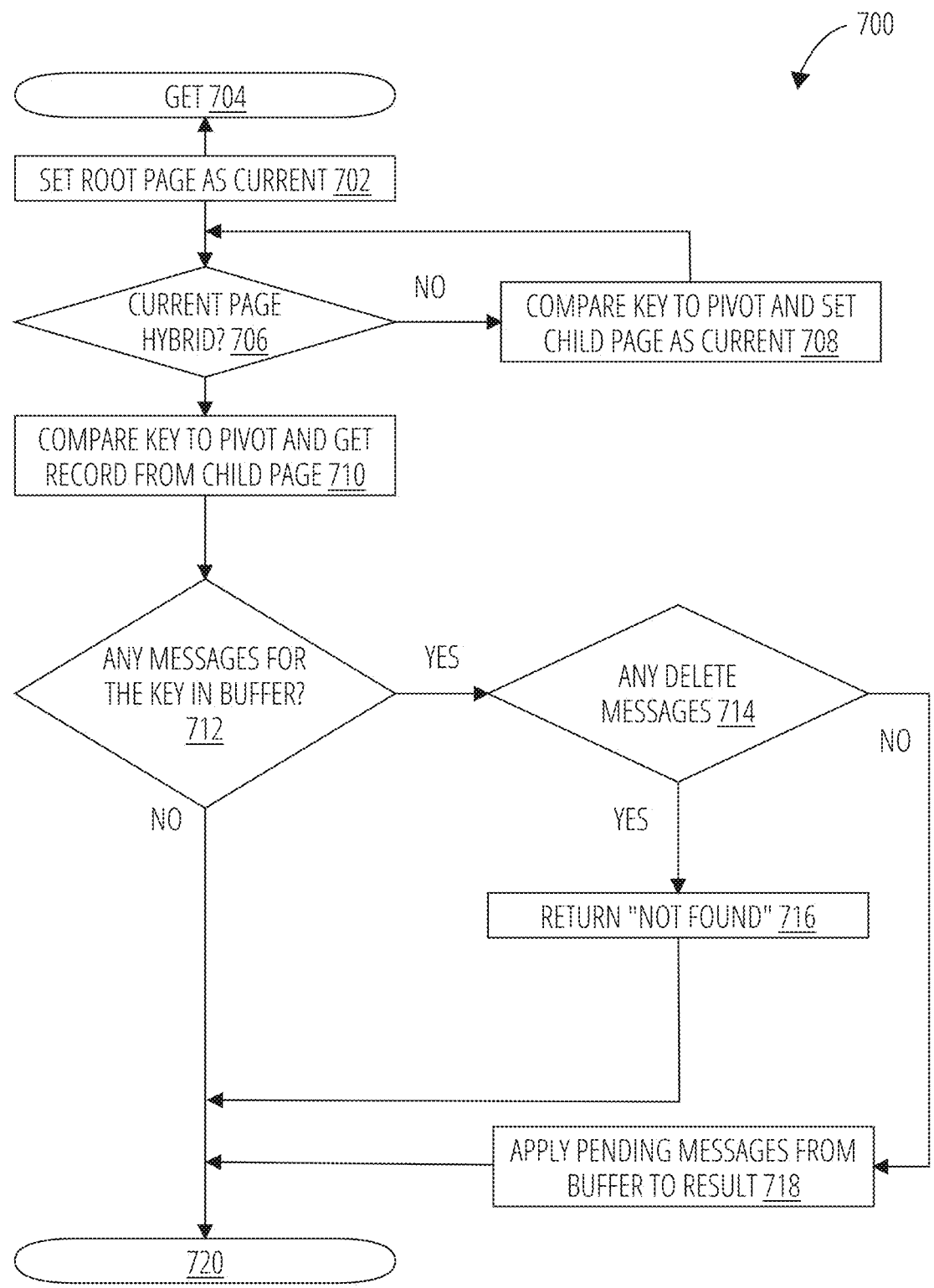
FIG. 7 illustrates a flow diagram of a query operation in accordance with one example embodiment.

FIG. 7 illustrates a flow diagram 700 in accordance with one example embodiment. Operations in the flow diagram 700 may be performed by the transactional data management system 202 using components (e.g., modules, engines) described above with respect to FIG. 2. Accordingly, the flow diagram 700 is described by way of example with reference to the transactional data management system 202. However, it shall be appreciated that at least some of the operations of the flow diagram 700 may be deployed on various other hardware configurations or be performed by similar components residing elsewhere.

At block 702, the transactional data management system 202 receives an operation to query data. At block 702, the get module 208 sets a root page as current. At decision block 706, the get module 208 determines whether the current page is a hybrid page (e.g., hybrid node layer). If not, the get module 208 compares the key to the pivot and set the child page as current at block 708.

If the get module 208 determines that the current page is a hybrid page at decision block 706, the get module 208 compares the key to pivot and get record from child page at block 710. At decision block 712, the get module 208 determines whether any messages for the key are in the buffer. If there are no messages for the key in the buffer, the get module 208 ends its operation at block 720.

If there are messages for the key in the buffer, the get module 208 determines whether there are any delete messages at decision block 714. If there are delete messages in the buffer, the get module 208 returns "not found" at block 716 and ends its operation at block 720. If there are no delete messages in the buffer, the get module 208 applies pending messages from the buffer to the result at block 718 and ends it operation at block 720.

Figure 8:
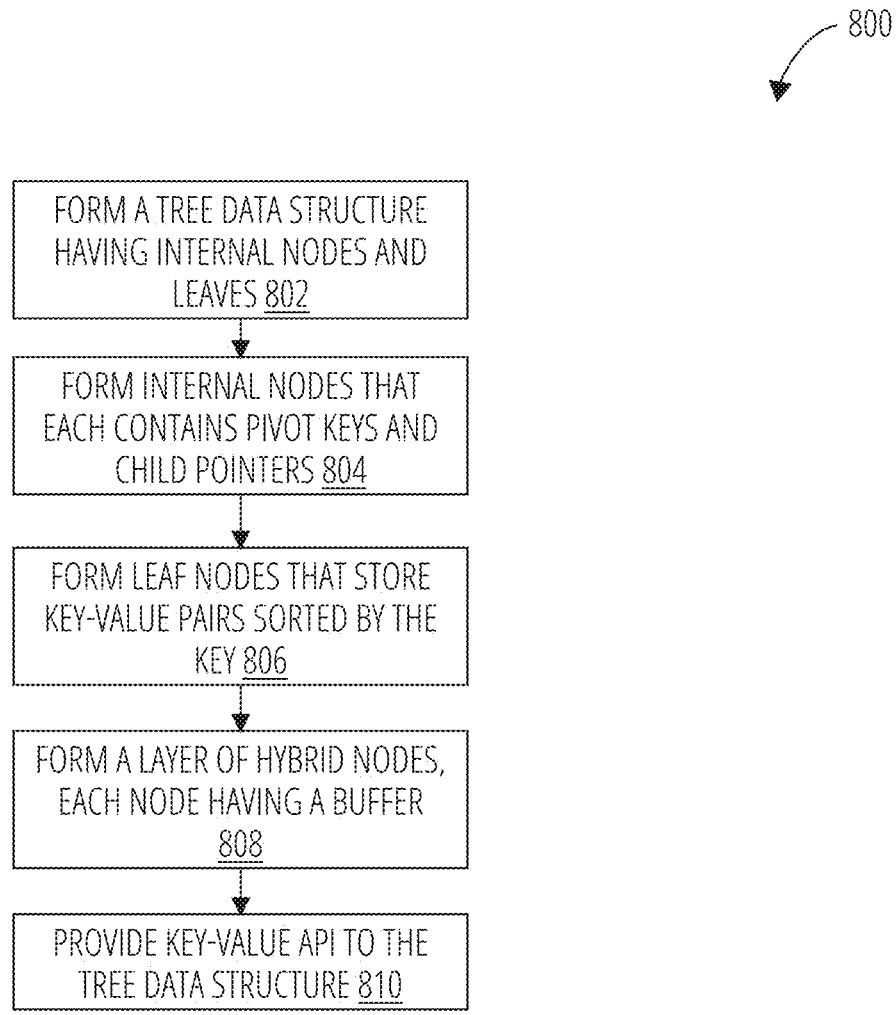
FIG. 8 illustrates a flow diagram of a method for forming a tree data structure in accordance with one example embodiment.

FIG. 8 illustrates a flow diagram 800 in accordance with one example embodiment. Operations in the flow diagram 800 may be performed by the transactional data management system 202 using components (e.g., modules, engines) described above with respect to FIG. 2. Accordingly, the flow diagram 800 is described by way of example with reference to the tree structure module 212. However, it shall be appreciated that at least some of the operations of the flow diagram 800 may be deployed on various other hardware configurations or be performed by similar components residing elsewhere.

At block 802, the tree structure module 212 forms a tree data structure having internal nodes and leaves. At block 804, the tree structure module 212 forms internal nodes that each contains pivot keys and child pointers. At block 806, the tree structure module 212 forms leaf nodes that store key-value pairs sorted by the pivot key. At block 808, the tree structure module 212 forms a layer of hybrid nodes, each node having a buffer. At block 810, the tree structure module 212 provides key-value API to the tree data structure 300.

Figure 9:
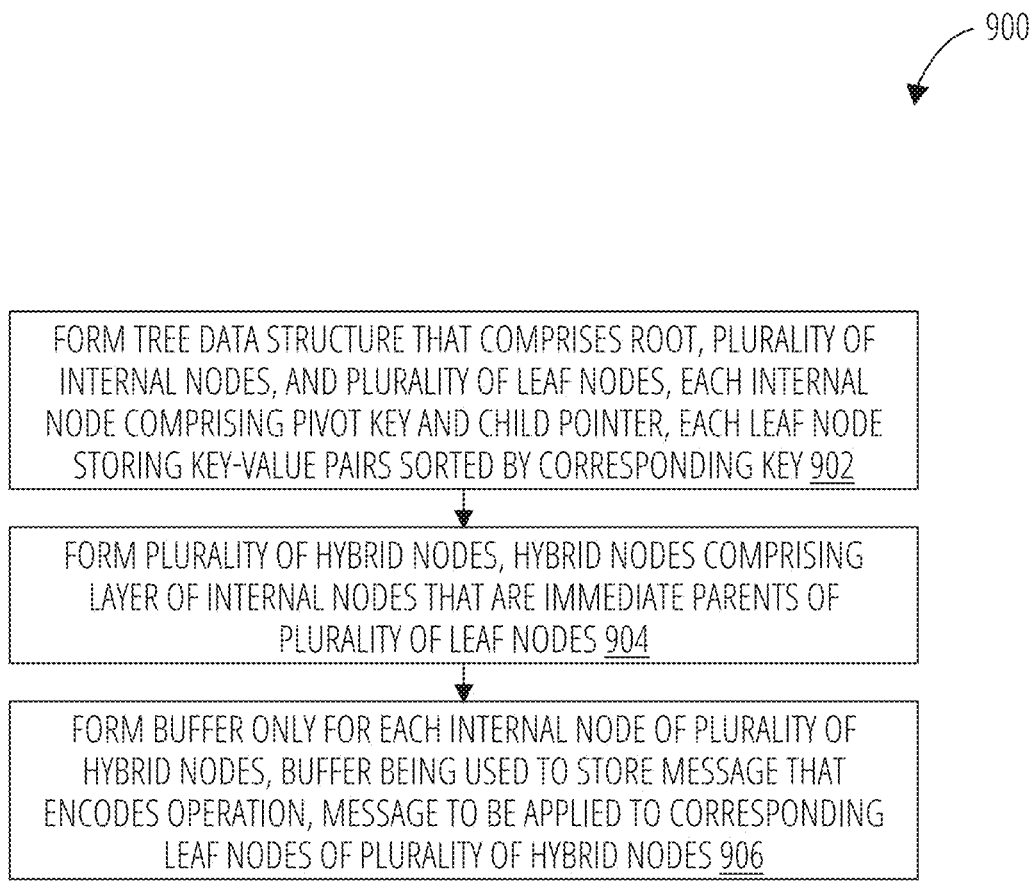
FIG. 9 illustrates a routine in accordance with one example embodiment.

FIG. 9 illustrates a routine in accordance with one example embodiment. In block 902, routine 900 forms a tree data structure that comprises a root, a plurality of internal nodes, and a plurality of leaf nodes, each internal node comprising a pivot key and a child pointer, each leaf node storing key-value pairs sorted by a corresponding key. In block 904, routine 900 forms a plurality of hybrid nodes, the hybrid nodes comprising a layer of internal nodes that are immediate parents of the plurality of leaf nodes. In block 906, routine 900 forms a buffer only for each internal node of the plurality of hybrid nodes, the buffer being used to store a message that encodes an operation, the message to be applied to the corresponding leaf nodes of the plurality of hybrid nodes.

Figure 10:
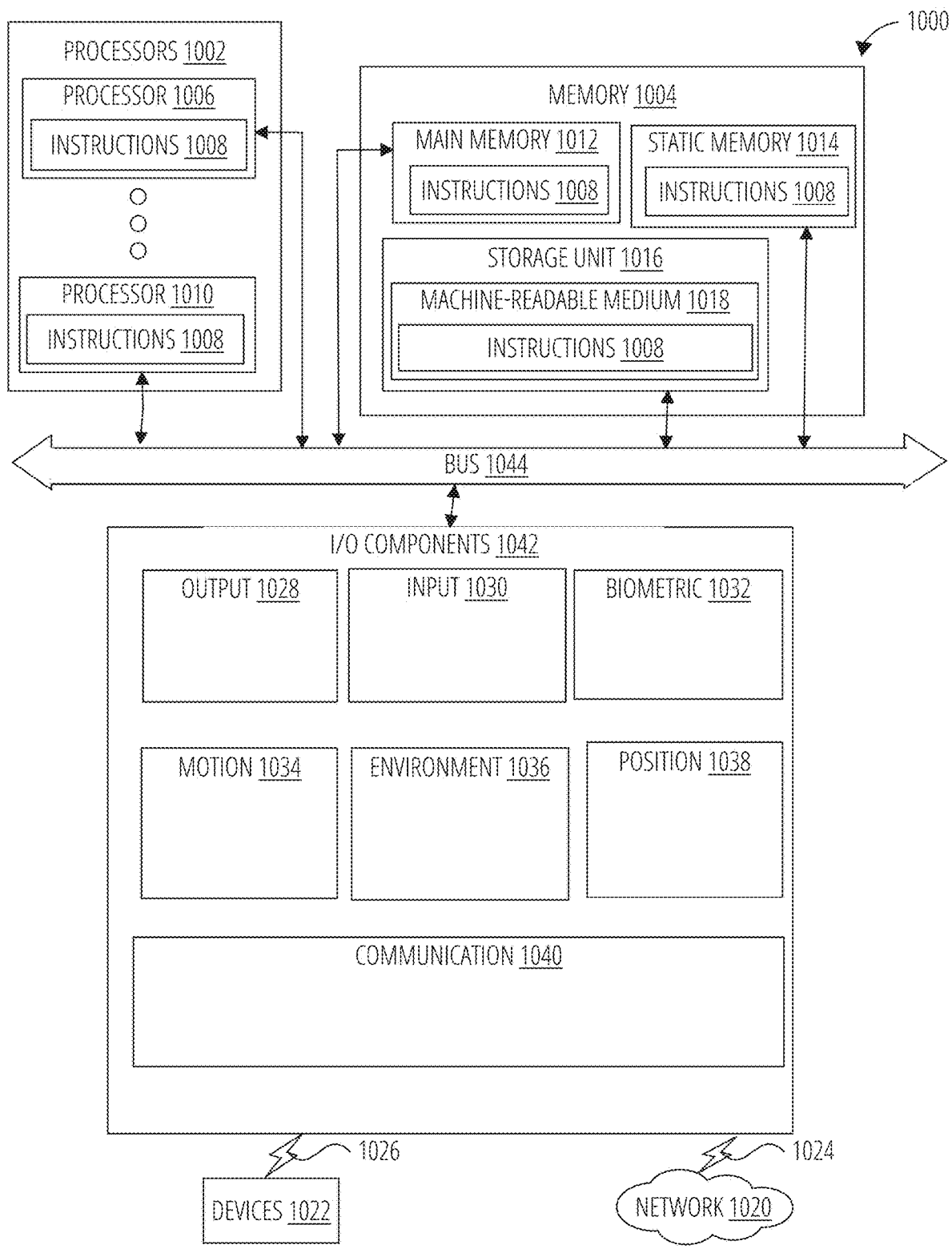
FIG. 10 is a diagrammatic representation of a machine in the form of a computer system within which a set of instructions may be executed for causing the machine to perform any one or more of the methodologies discussed herein, according to an example embodiment.

FIG. 10 is a diagrammatic representation of the machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein.

The machine 1000 may include processors 1002, memory 1004, and I/O components 1042, which may be configured to communicate with each other via a bus 1044. In an example embodiment, the processors 1002 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, both accessible to the processors 1002 via the bus 1044. The main memory 1004, the static memory 1014, and storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors 1002 (e.g., within the processor's cache memory), or any suitable combination thereof, during execution thereof by the machine 1000.

The I/O components 1042 may include a wide variety of components to receive input, provide output, produce output, transmit information, exchange information, capture measurements, and so on. The specific I/O components 1042 that are included in a particular machine will depend on the type of machine. For example, portable machines such as mobile phones may include a touch input device or other such input mechanisms, while a headless server machine will likely not include such a touch input device. It will be appreciated that the I/O components 1042 may include many other components that are not shown in FIG. 10. In various example embodiments, the I/O components 1042 may include output components 1028 and input components 1030. The output components 1028 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1030 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1042 may include biometric components 1032, motion components 1034, environmental components 1036, or position components 1038, among a wide array of other components. For example, the biometric components 1032 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1034 include acceleration sensor components (e.g., accelerometer), gravitation sensor components, rotation sensor components (e.g., gyroscope), and so forth. The environmental components 1036 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1042 further include communication components 1040 operable to couple the machine 1000 to a network 1020 or devices 1022 via a coupling 1024 and a coupling 1026, respectively. For example, the communication components 1040 may include a network interface component or another suitable device to interface with the network 1020. In further examples, the communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geolocation, location via Wi-Fi® signal triangulation, location via detecting an NFC beacon signal that may indicate a particular location, and so forth.

The various memories (e.g., memory 1004, main memory 1012, static memory 1014, and/or memory of the processors 1002) and/or storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed embodiments.

The instructions 1008 may be transmitted or received over the network 1020, using a transmission medium, via a network interface device (e.g., a network interface component included in the communication components 1040) and using any one of a number of well-known transfer protocols (e.g., hypertext transfer protocol (HTTP)). Similarly, the instructions 1008 may be transmitted or received using a transmission medium via the coupling 1026 (e.g., a peer-to-peer coupling) to the devices 1022.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

EXAMPLES

Example 1 is a computer-implemented method, comprising: storing a tree data structure that comprises a root, a plurality of internal nodes, and a plurality of leaf nodes, each internal node comprising a pivot key and a child pointer, each leaf node storing key-value pairs sorted by a corresponding key; forming a plurality of hybrid nodes, the hybrid nodes comprising a layer of internal nodes that are immediate parents of the plurality of leaf nodes; and forming a buffer only for each internal node of the plurality of hybrid nodes, the buffer being used to store a message that encodes an operation, the message to be applied to the corresponding leaf nodes of the plurality of hybrid nodes.

Example 2 includes any of the above example, further comprising: receiving an operation to be performed on the tree data structure, the operation encoded as a message addressed to a particular pivot key; and adding the message to a buffer of a hybrid node located along a path from the root to a leaf node of the plurality of leaf nodes.

Example 3 includes any of the above examples, further comprising: detecting that the buffer of the hybrid node is full; and in response to detecting that the buffer of the hybrid node is full, selecting a child leaf node of the hybrid node, the child leaf node with the most pending messages, and applying a batch of messages to the selected child leaf node.

Example 4 includes any of the above examples, further comprising: detecting that the leaf node is full; and in response to detecting that the leaf node is full, splitting the leaf node with a new leaf node and adding a pointer to the new leaf node to one of the plurality of hybrid nodes.

Example 5 includes any of the above examples, further comprising: detecting that a number of leaf nodes corresponding to a hybrid node of the plurality of hybrid nodes exceeds a threshold; in response to detecting that the number of leaf nodes corresponding to the hybrid node of the plurality of hybrid nodes exceeds the threshold, splitting the hybrid node into a first and a second hybrid node; and distributing pending messages from the hybrid nodes with the first and second hybrid nodes.

Example 6 includes any of the above examples, further comprising: receiving an insert operation to be performed on the tree data structure, the insert operation encoded as an insert message; setting a root page as a current page; detecting that the current page includes a hybrid node and that a buffer of the hybrid node includes enough room for the insert message; and in response to detecting that the current page includes the hybrid node and that the buffer of the hybrid node includes enough room for the insert message, inserting the insert message into the buffer of the hybrid node.

Example 7 includes any of the above examples, further comprising: receiving an update operation to be performed on the tree data structure, the update operation encoded as an update message; setting a root page as a current page; detecting that the current page includes a hybrid node and that a buffer of the hybrid node includes enough room for the update message; and in response to detecting that the current page includes the hybrid node and that the buffer of the hybrid node includes enough room for the update message, inserting the update message into the buffer of the hybrid node.

Example 8 includes any of the above examples, further comprising: receiving a delete operation to be performed on the tree data structure, the delete operation encoded as a delete message; setting a root page as a current page; detecting that the current page includes a hybrid node and that a buffer of the hybrid node includes enough room for the delete message; and in response to detecting that the current page includes the hybrid node and that the buffer of the hybrid node includes enough room for the delete message, inserting the delete message into the buffer of the hybrid node.

Example 9 includes any of the above examples, further comprising: receiving a query operation to be performed on the tree data structure, the query operation encoded as a query message; setting a root page as a current page; detecting that the current page includes a hybrid node; in response to detecting that the current page includes the hybrid node, comparing a key to a pivot and obtain record from a child page; and detecting whether there are messages for the key in a buffer of the hybrid node.

Example 10 includes any of the above examples, wherein the operation comprises one of an insert operation, an update operation, a delete operation, or a query operation, wherein the method further comprises: providing concurrent access to the tree data structure with the plurality of hybrid nodes; and recording a modification of the tree data structure in a transaction log based on messages traveling through the plurality of hybrid nodes.

What is claimed is:

1. A computer-implemented method, comprising:
   storing a tree data structure that comprises a root, a plurality of internal nodes, and a plurality of leaf nodes, each internal node comprising a pivot key and a child pointer, each leaf node storing key-value pairs sorted by a corresponding key, wherein the tree data structure comprises an index nodes layer and a leaf nodes layer;
   forming a hybrid nodes layer between the index nodes layer and the leaf nodes layer, the hybrid nodes layer comprising a plurality of hybrid nodes, the hybrid nodes comprising a layer of internal nodes that are immediate parents of the plurality of leaf nodes, the index nodes layer comprising the root that points to nodes of the hybrid nodes layer, each node of the hybrid nodes layer pointing to one of the plurality of leaf nodes, the hybrid nodes combining features of the plurality of internal nodes and the plurality of leaf nodes; and
   forming a plurality of buffers for the plurality of hybrid nodes, each internal node of the plurality of hybrid nodes having a corresponding buffer, the buffer being used to store a message that encodes an operation, the message to be applied to the corresponding leaf nodes of the leaf nodes layer.

2. The computer-implemented method of claim 1, further comprising:
   receiving an operation to be performed on the tree data structure, the operation encoded as a message addressed to a particular pivot key; and
   adding the message to a buffer of a hybrid node located along a path from the root to a leaf node of the plurality of leaf nodes.

3. The computer-implemented method of claim 2, further comprising:
   detecting that the buffer of the hybrid node is full; and
   in response to detecting that the buffer of the hybrid node is full, selecting a child leaf node of the hybrid node, the child leaf node with the most pending messages, and applying a batch of messages to the selected child leaf node.

4. The computer-implemented method of claim 2, further comprising:
   detecting that the leaf node is full; and
   in response to detecting that the leaf node is full; splitting the leaf node with a new leaf node and adding a pointer to the new leaf node to one of the plurality of hybrid nodes.

5. The computer-implemented method of claim 2, further comprising:
   detecting that a number of leaf nodes corresponding to a hybrid node of the plurality of hybrid nodes exceeds a threshold;
   in response to detecting that the number of leaf nodes corresponding to the hybrid node of the plurality of hybrid nodes exceeds the threshold, splitting the hybrid node into a first and a second hybrid node; and
   distributing pending messages from the hybrid nodes with the first and second hybrid nodes.

6. The computer-implemented method of claim 1, further comprising:
   receiving an insert operation to be performed on the tree data structure, the insert operation encoded as an insert message;
   setting a root page as a current page;
   detecting that the current page includes a hybrid node and that a buffer of the hybrid node includes enough room for the insert message; and
   in response to detecting that the current page includes the hybrid node and that the buffer of the hybrid node includes enough room for the insert message, inserting the insert message into the buffer of the hybrid node.

7. The computer-implemented method of claim 1, further comprising:
   receiving an update operation to be performed on the tree data structure, the update operation encoded as an update message;
   setting a root page as a current page;

detecting that the current page includes a hybrid node and that a buffer of the hybrid node includes enough room for the update message; and in response to detecting that the current page includes the hybrid node and that the buffer of the hybrid node includes enough room for the update message, inserting the update message into the buffer of the hybrid node.

8. The computer-implemented method of claim 1, further comprising:

receiving a delete operation to be performed on the tree data structure, the delete operation encoded as a delete message;

setting a root page as a current page;

detecting that the current page includes a hybrid node and that a buffer of the hybrid node includes enough room for the delete message; and in response to detecting that the current page includes the hybrid node and that the buffer of the hybrid node includes enough room for the delete message, inserting the delete message into the buffer of the hybrid node.

9. The computer-implemented method of claim 1, further comprising:

receiving a query operation to be performed on the tree data structure, the query operation encoded as a query message;

setting a root page as a current page;

detecting that the current page includes a hybrid node;

in response to detecting that the current page includes the hybrid node, comparing a key to a pivot and obtain record from a child page; and detecting whether there are messages for the key in a buffer of the hybrid node.

10. The computer-implemented method of claim 1, wherein the operation comprises one of an insert operation, an update operation, a delete operation, or a query operation, wherein the method further comprises:

providing concurrent access to the tree data structure with the plurality of hybrid nodes; and recording a modification of the tree data structure in a transaction log based on messages traveling through the plurality of hybrid nodes.

11. A computing apparatus, the computing apparatus comprising:

a processor; and a memory storing instructions that, when executed by the processor, configure the apparatus to:

store a tree data structure that comprises a root, a plurality of internal nodes, and a plurality of leaf nodes, each internal node comprising a pivot key and a child pointer, each leaf node storing key-value pairs sorted by a corresponding key, wherein the tree data structure comprises an index nodes layer and a leaf nodes layer;

form a hybrid nodes layer between the index nodes layer and the leaf nodes layer, the hybrid nodes layer comprising a plurality of hybrid nodes, the hybrid nodes comprising a layer of internal nodes that are immediate parents of the plurality of leaf nodes, the index nodes layer comprising the root that points to nodes of the hybrid nodes layer, each node of the hybrid nodes layer pointing to one of the plurality of leaf nodes, the hybrid nodes combining features of the plurality of internal nodes and the plurality of leaf nodes; and form a plurality of buffers for the plurality of hybrid nodes, each internal node of the plurality of hybrid nodes having a corresponding buffer, the buffer being used to store a message that encodes an operation, the message to be applied to the corresponding leaf nodes of the leaf nodes layer.

12. The computing apparatus of claim 11, wherein the instructions further configure the apparatus to:

receive an operation to be performed on the tree data structure, the operation encoded as a message addressed to a particular pivot key; and add the message to a buffer of a hybrid node located along a path from the root to a leaf node of the plurality of leaf nodes.

13. The computing apparatus of claim 12, wherein the instructions further configure the apparatus to:

detect that the buffer of the hybrid node is full; and in response to detecting that the buffer of the hybrid node is full, select a child leaf node of the hybrid node, the child leaf node with the most pending messages, and applying a batch of messages to the selected child leaf node.

14. The computing apparatus of claim 12, wherein the instructions further configure the apparatus to:

detect that the leaf node is full; and in response to detecting that the leaf node is full, split the leaf node with a new leaf node and adding a pointer to the new leaf node to one of the plurality of hybrid nodes.

15. The computing apparatus of claim 12, wherein the instructions further configure the apparatus to:

detect that a number of leaf nodes corresponding to a hybrid node of the plurality of hybrid nodes exceeds a threshold;

in response to detecting that the number of leaf nodes corresponding to the hybrid node of the plurality of hybrid nodes exceeds the threshold, split the hybrid node into a first and a second hybrid node; and distribute pending messages from the hybrid nodes with the first and second hybrid nodes.

16. The computing apparatus of claim 11, wherein the instructions further configure the apparatus to:

receive an insert operation to be performed on the tree data structure, the insert operation encoded as an insert message;

set a root page as a current page;

detect that the current page includes a hybrid node and that a buffer of the hybrid node includes enough room for the insert message; and in response to detecting that the current page includes the hybrid node and that the buffer of the hybrid node includes enough room for the insert message, insert the insert message into the buffer of the hybrid node.

17. The computing apparatus of claim 11, wherein the instructions further configure the apparatus to:

receive an update operation to be performed on the tree data structure, the update operation encoded as an update message;

set a root page as a current page;

detect that the current page includes a hybrid node and that a buffer of the hybrid node includes enough room for the update message; and in response to detecting that the current page includes the hybrid node and that the buffer of the hybrid node includes enough room for the update message, insert the update message into the buffer of the hybrid node.

18. The computing apparatus of claim 11, wherein the instructions further configure the apparatus to:

receive a delete operation to be performed on the tree data structure, the delete operation encoded as a delete message;

set a root page as a current page;

detect that the current page includes a hybrid node and that a buffer of the hybrid node includes enough room for the delete message; and in response to detecting that the current page includes the hybrid node and that the buffer of the hybrid node includes enough room for the delete message, insert the delete message into the buffer of the hybrid node.

19. The computing apparatus of claim 11, wherein the instructions further configure the apparatus to:

receive a query operation to be performed on the tree data structure, the query operation encoded as a query message;

set a root page as a current page;

detect that the current page includes a hybrid node;

in response to detecting that the current page includes the hybrid node, compare a key to a pivot and obtain record from a child page; and detect whether there are messages for the key in a buffer of the hybrid node.

20. A non-transitory computer-readable storage medium, the computer-readable storage medium including instructions that when executed by a computer, cause the computer to:

store a tree data structure that comprises a root, a plurality of internal nodes, and a plurality of leaf nodes, each internal node comprising a pivot key and a child pointer, each leaf node storing key-value pairs sorted by a corresponding key, wherein the tree data structure comprises an index nodes layer and a leaf nodes layer;

form a hybrid nodes layer between the index nodes layer and the leaf nodes layer, the hybrid nodes layer comprising a plurality of hybrid nodes, the hybrid nodes comprising a layer of internal nodes that are immediate parents of the plurality of leaf nodes, the index nodes layer comprising the root that points to nodes of the hybrid nodes layer, each node of the hybrid nodes layer pointing to one of the plurality of leaf nodes, the hybrid nodes combining features of the plurality of internal nodes and the plurality of leaf nodes; and form a plurality of buffers for the plurality of hybrid nodes, each internal node of the plurality of hybrid nodes having a corresponding buffer, the buffer being used to store a message that encodes an operation, the message to be applied to the corresponding leaf nodes of the leaf nodes layer.

* * * * *